United States Patent [19]

Vijay

[11] Patent Number: 4,760,871
[45] Date of Patent: Aug. 2, 1988

[54] LOWER BEAD BREAKER REMOVAL AND ADJUSTMENT APPARATUS

[75] Inventor: Tumkur R. Vijay, Conway, Ark.

[73] Assignee: FMC Corporation, Chicago, Ill.

[21] Appl. No.: 906,555

[22] Filed: Sep. 8, 1986

Related U.S. Application Data

[63] Continuation of Ser. No. 754,381, Jul. 11, 1985, abandoned.

[51] Int. Cl.$^4$ .............................................. B60C 25/06
[52] U.S. Cl. .................................... 157/1.28; 403/324
[58] Field of Search ................... 157/1.17, 1.34, 1.26, 157/1.28; 269/70, 271, 279–281, 284; 403/324–325, 379, 157; 29/229, 426.5

[56] References Cited
U.S. PATENT DOCUMENTS

| | | | |
|---|---|---|---|
| 3,180,392 | 4/1965 | Foster | 157/1.28 |
| 3,403,901 | 10/1968 | Servadio | 269/284 X |
| 3,556,192 | 1/1971 | Strang et al. | 157/1.28 |
| 3,844,328 | 10/1974 | Lund | 157/1.26 X |
| 4,105,347 | 8/1978 | Gossage | 403/324 X |
| 4,389,135 | 6/1983 | Peters | 403/379 X |
| 4,423,761 | 1/1984 | Wood | 157/1.28 |

Primary Examiner—Debra Meislin
Attorney, Agent, or Firm—H. M. Stanley; R. B. Megley

[57] ABSTRACT

A lower bead breaker quick release for a tire changing machine includes a manually overpowered spring lock mechanism that keeps the lower bead breaker in position during lower and upper bead breaking operations. Manual compression of the spring lock allows the lower bead breaker pivot shaft to be positioned axially to allow complete removal of the lower bead breaker from the tire changing machine. A manually actuated, friction locked lower bead breaker attitude adjustment is also provided.

9 Claims, 3 Drawing Sheets

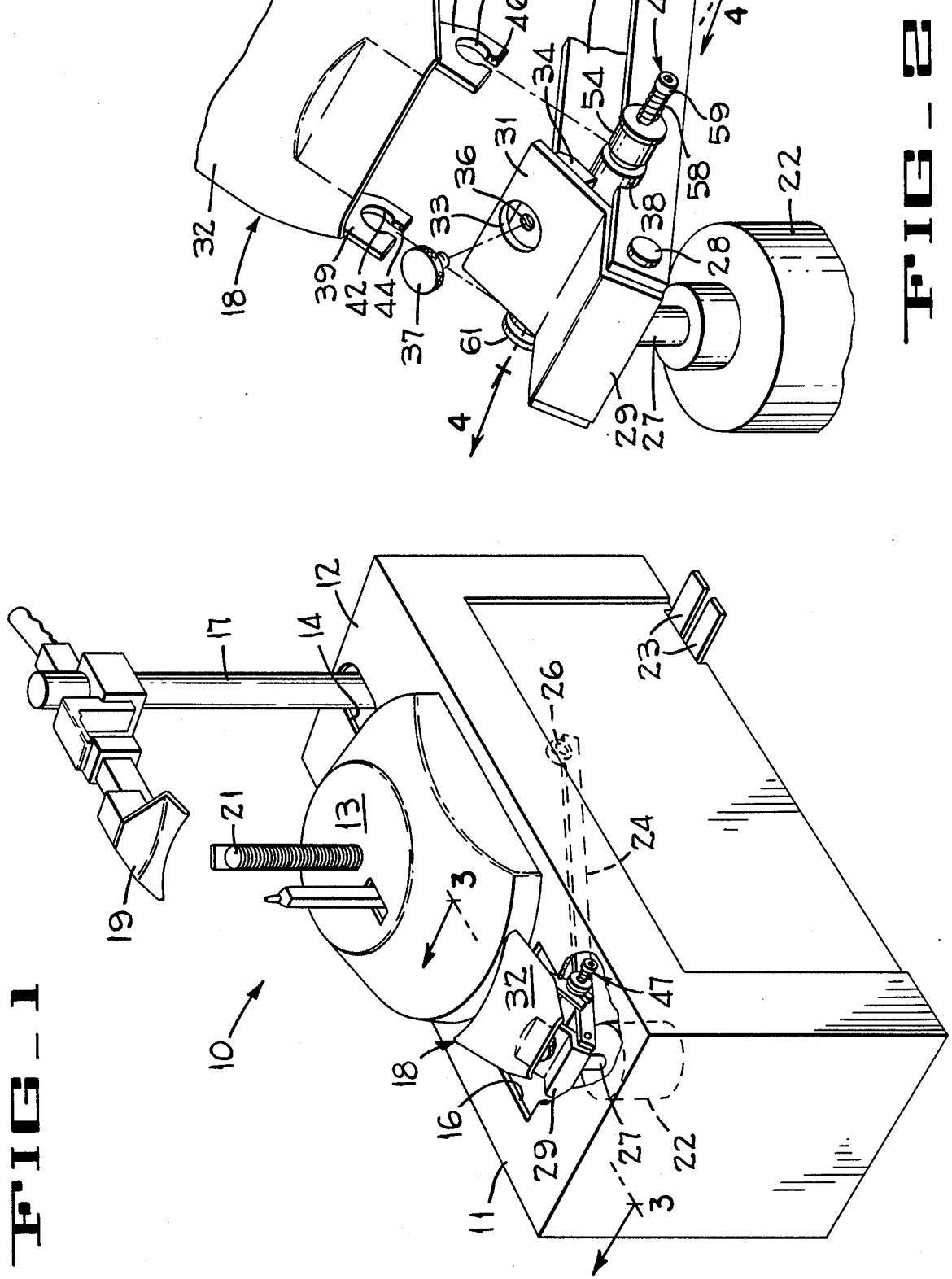

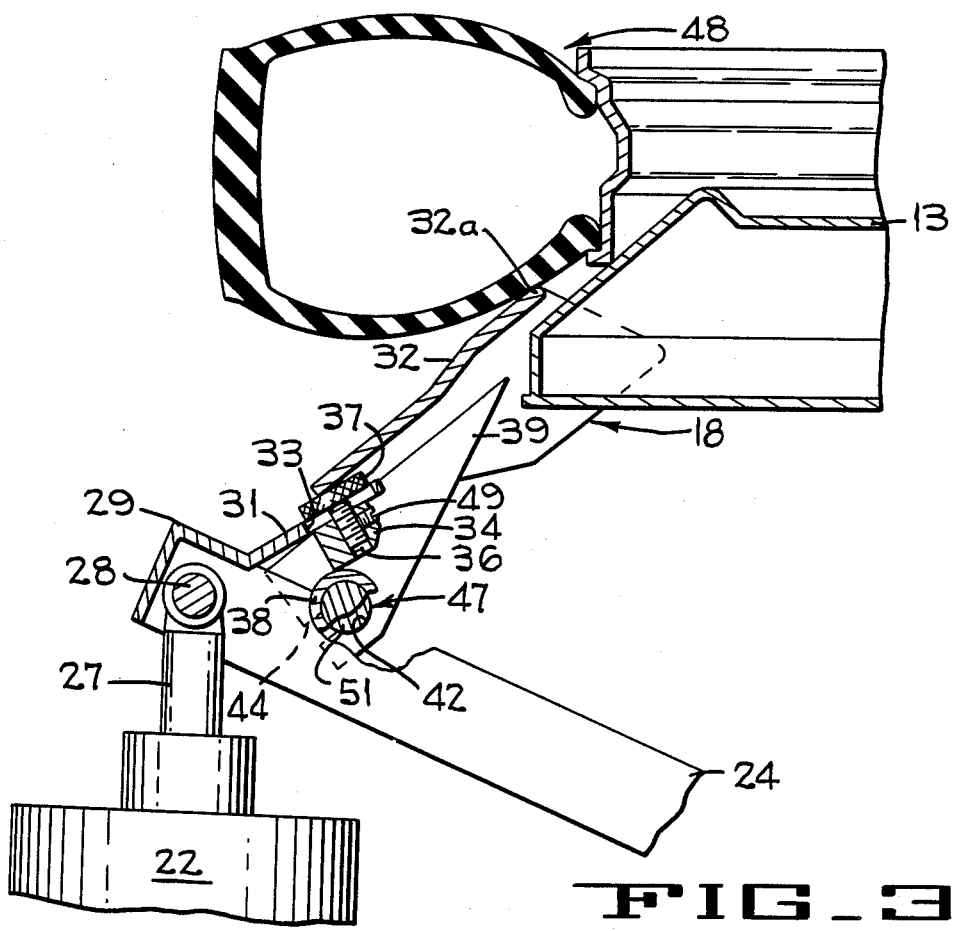
FIG_3A
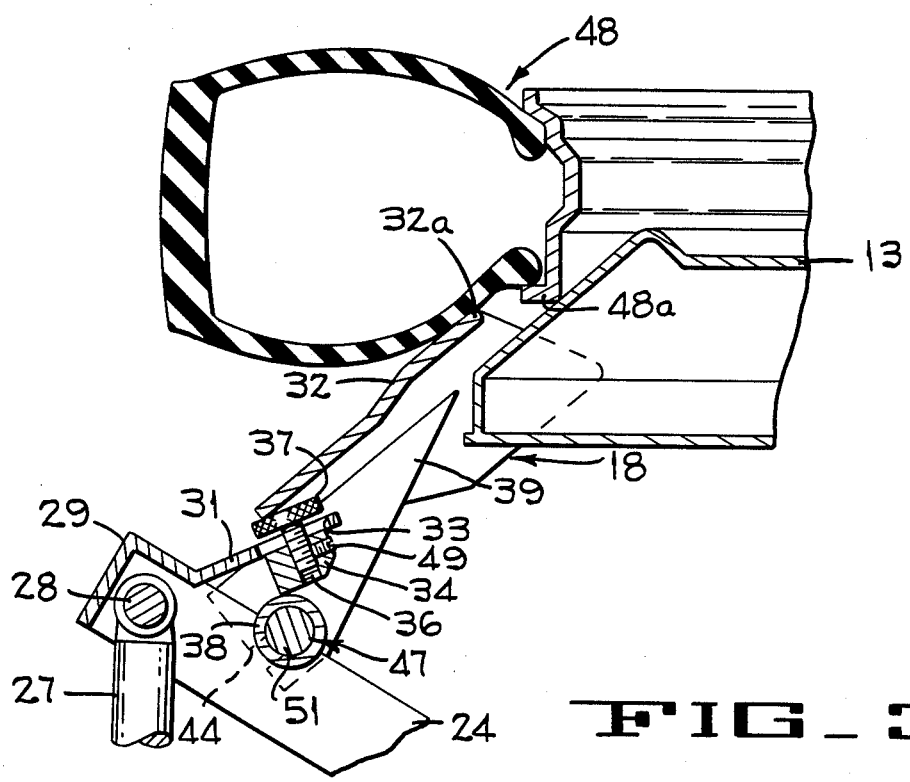
FIG_3B

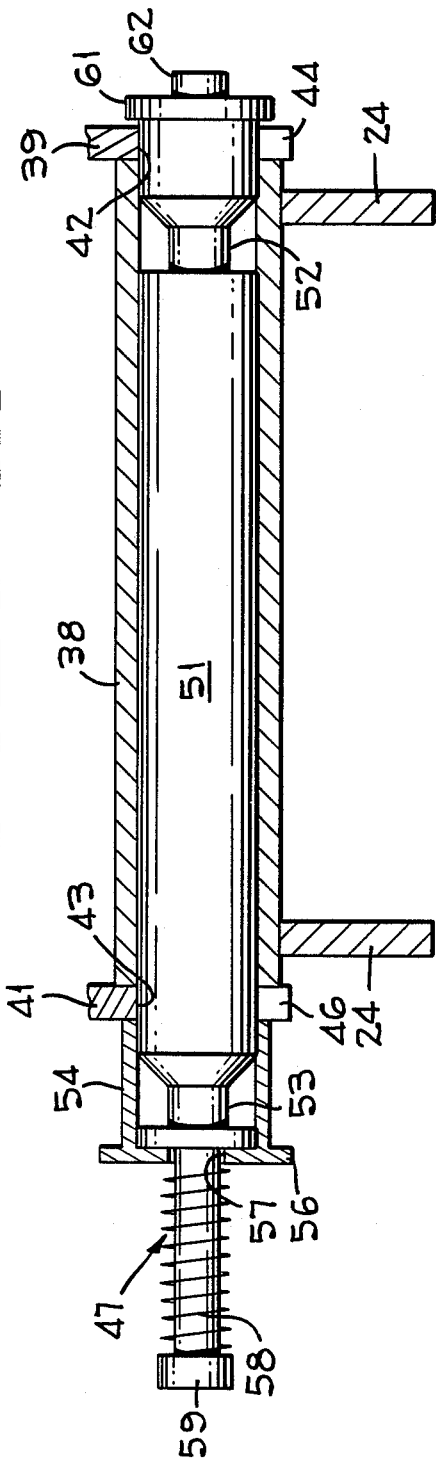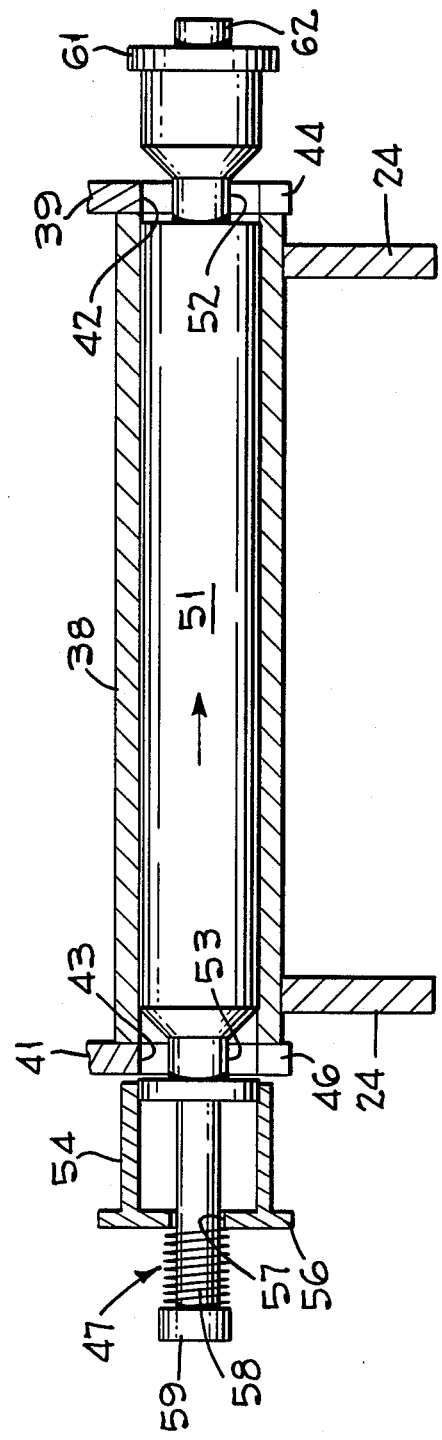

LOWER BEAD BREAKER REMOVAL AND ADJUSTMENT APPARATUS

This application is a continuation of application Ser. No. 06/754,381, filed Jul. 11, 1985 now abandoned.

BACKGROUND OF THE INVENTION

This invention relates to a tire changing machine and more particularly to such a machine which supports a tire and rim assembly to be changed in a horizontal position with upper and lower bead breakers which operate to separate the tire beads from the wheel rim. Further, the invention is directed to a bead breaker configured for quick removal from the tire changing machine.

SUMMARY OF THE INVENTION

The invention disclosed herein relates to a combination which includes a tire changing machine of the type wherein a framework supports a wheel rim support table which is adapted to receive and secure a wheel rim thereon. A bead breaker mechanism is provided which includes a bead breaker shoe operatively connected to a bead breaker lever. A power source is coupled to drive the lever so that the shoe is driven toward a rim and tire assembly mounted on the support table to break the tire bead away from the rim. Quick release means is provided for detaching the bead breaker shoe from the bead breaker lever.

In another aspect of the invention the combination relates to a lower bead breaker apparatus for separating a tire from a wheel rim, wherein a bead breaker lever has a lower bead breaking shoe pivotally mounted thereon. The lever is driven toward and away from a position on a tire changing machine adjacent to a wheel rim support table which is adapted to mount a wheel rim and tire assembly. A quick release means is provided for detaching the lower bead breaking shoe from the bead breaker lever and an adjustment means is provided for setting the attitude of the lower bead breaking shoe relative to the wheel rim support table.

BRIEF DESCRIPTION OF THE DRAWINGS

FIG. 1 is a perspective view of a tire changer with the cover partially broken away to reveal the general area of the lower bead breaker on the machine.

FIG. 2 is a partial perspective view of the tire changing machine lower bead breaker in accordance with the present invention.

FIG. 3A is a section taken in the direction of the arrows 3—3 of FIG. 1.

FIG. 3B is another section taken in the direction of the arrows 3—3 of FIG. 1.

FIG. 4A is a section taken in the direction of the arrows 4—4 of FIG. 2.

FIG. 4B is another section taken in the direction of the arrows 4—4 of FIG. 2.

DESCRIPTION OF THE PREFERRED EMBODIMENT

FIG. 1 shows a tire changing machine of the type disclosed in U.S. Pat. No. 4,335,772, issued June 22, 1982 owned by the Assignee herein. As shown in that U.S. patent a tire changing machine is depicted generally at 10 having a casing or cover 11 surrounding an underlying frame. An upper surface 12 of the cover 11 is shown, through which extends a frusto-conical shaped wheel rim support table 13. There are openings 14 and 16 in the upper surface 12 of the tire changer cover through which extend an upper bead breaker power column 17 and portions of a lower bead breaker assembly 18 respectively. An upper bead breaker assembly 19 is shown supported on the power column 17 and a rotatable shaft 21 is shown extending through the center of the wheel rim support table 13.

The slot 16 through which a portion of the lower bead breaker assembly 18 extends is enlarged in FIG. 1 by cutting away additional portions of the upper surface 12 in the tire changer. One of two coupled drive pistons 22 is shown mounted within the tire changer on the frame thereof. The manner in which the drive piston 22 and its companion drive piston (not shown) are coupled together and energized to drive the upper and lower bead breaker assemblies 19 and 18 respectively is explained in detail in the aforementioned U.S. Pat. No. 4,335,772. The drive pistons and mechanisms are actuated by operation of the foot pedals 23 provided at the base of the tire changer as seen in FIG. 1.

As may be seen in FIG. 1 the drive piston 22 is pivotally attached to the end of a lower bead breaker drive lever 24 which is pivoted at the opposite end at a pivot point 26 on the tire changing machine frame. The details of the drive lever and the lower bead breaker structure 18 may be seen more clearly with reference to FIG. 2. As seen therein, the drive lever 24 consists of two parallel extending lever arms.

The lower bead breaker drive cylinder 22 is attached to the lower bead breaker drive levers 24 by means of a piston extension 27 from the drive cylinder and a drive pivot bar 28 extending between the ends of the levers 24. A shaped metal part 29 is formed to extend around the ends of the levers 24 and has an angled upwardly extending end 31. The end 31 of the shaped metal part is visible in FIG. 2, because a lower bead breaker shoe 32 is shown removed from its normal position which overlies the upwardly extending end. A clearance hole 33 is formed in the upwardly extending end of the part 31 and a reinforcing bar 34 is welded to the backside of the end as shown in FIG. 2. The reinforcing bar has a threaded hole 36 aligned with the clearance hole 33. A threaded knurled lower shoe adjustment knob 37 is provided which engages the threads in the hole 36. A lower shoe pivot tube 38 is welded between the levers 24 behind the upwardly extending end 31 of the part 29.

The lower bead breaker shoe 32 may be seen in FIG. 2 to have two lower bead breaker shoe support arms 39 and 41 attached thereto and extending therefrom. A bearing aperture 42 is formed in support arm 39 and a similar bearing aperture 43 is formed in support arm 41. An opening 44 is formed in the support arm 39 which extends between the bearing opening 42 and the edge of the support arm. This opening is formed by removing a segment of the support arm, wherein the removed segment has a width which is less than the diameter of the bearing opening 42. A similar opening 46 is formed in the support arm 41 extending between the bearing opening 43 and the edge of the support arm and having a width which is less than the diameter of the opening 43. The removed segments of the bead breaker shoe support arms extending between the bearing openings and the edges of the support arms may be likened to keyways in the disclosed structure. A pivot shaft assembly shown generally at 47 is received within the pivot tube 38 and serves to provide a pivot for the lower bead breaker shoe 32 when it is engaged by the bearing openings 42 and 43.

With reference now to FIGS. 3A and 3B a section through the tire changing machine is shown which bisects the wheel rim support table 13 and a tire and rim assembly 48 shown mounted thereon in the fashion disclosed in U.S. Pat. No. 4,335,772 mentioned hereinbefore. The drive pivot 28 is shown at the end of the levers 24, together with the shaped metal part 29 attached to the end of the levers. A threaded reinforcing bar 34 is shown attached to the rear side of the upwardly extending end 31 on the shaped part 29 and the knurled threaded adjustment knob 27 is shown engaging the threads within the threaded hole 36. The clearance hole 33 in the end 31 is shown as being of such a diameter that it would accept the diameter of the knurled knob. A nylon tipped friction set screw 49, or any similar device, is brought to bear against the threaded shank of the knurled knob 37 to secure it in position in the presence of vibration.

A section through the lower bead breaker pivot shaft assembly 47 is also shown in FIG. 3A. The shaft assembly is supported in place by the lower shoe pivot tube 38. The bearing opening 42 in the lower bead breaker shoe support arm 39 is shown surrounding the pivot shaft assembly shown in FIG. 3A. A standard steel rim is shown in the wheel rim tire assembly 48 wherein the wheel rim adjacent the rim support table is of the more common or narrower width. Such being the case, a "dial" adjustment is provided wherein the knurled knob 37 may be adjusted in the threaded hole 36 so that it stands only slightly above the surface of the angled upwardly extending end 31 on the metal part 29. As a consequence, the lower bead breaker shoe 32 has its centrally located leading edge 32a relatively close to the surface of the frusto-conical wheel rim support table 13 as shown.

FIG. 3B has the same structural parts shown therein as described hereinbefore for the depiction of FIG. 3A. However, in FIG. 3B a wheel rim tire assembly 48 is shown wherein the wheel rim 48a adjacent the rim support table is of the less usual wider variety, such as exists in the structure of certain more expensive automobiles or in magnesium or aluminum cast rims. It may be seen that with the lower bead breaker shoe 32 attitude provided by the position of the knurled knob 37 in FIG. 3A, that the leading edge 32a of the lower bead breaking shoe would collide with the wide rim shown in FIG. 3B upon actuation of the tire changing machine to undertake the lower bead breaking stroke (lower bead breaker shoe proceeding upwardly and to the right as seen in FIGS. 3A or 3B). Consequently, the knurled knob 37 is rotated to cause the threaded shank thereof to extend further from the threaded hole 36. The contact between the bottom side of the lower bead breaker shoe 32 and the upper surface of the knurled knob 37 causes the leading edge 32a of the lower shoe to be elevated somewhat more off of the surface of the wheel rim support table 13 when compared with the attitude of the lower bead breaking shoe shown in FIG. 3A. As a result of the adjustment of the height of the knurled knob above the surface of the angled upwardly extending end 31 of the shaped part 29, an infinite adjustment of the attitude of the lower bead breaker shoe 32 is provided within the range of adjustment available. Rim widths of any available size may therefore be accommodated by the attitude adjustment provided for the lower bead breaker shoe.

With reference now to FIGS. 4A and 4B, a structural description will be provided for the quick release apparatus for the lower bead breaker shoe 32. The lower bead breaker pivot shaft assembly 47 is shown having a shaft member 51 extending through the lower shoe pivot tube 38 attached near the ends of the lower bead breaker lever arms 24. The pivot shaft may be seen to have two spaced release diameters 52 and 53 which are smaller than the width of the removed segments or keyways 44 and 46 respectively. The major diameter of the pivot shaft 51 may be seen to lie on both sides of the release diameter 52 and is sized to fit within the bearing openings 42 and 43. The major diameter of the pivot shaft therefore is slidable axially within the pivot tube 38 and the bearing openings 42 and 43.

A locking cap 54 is shown disposed at one end of the pivot shaft assembly having an inside diameter which surrounds the major diameter of the pivot shaft 51. The locking cap is open at one end to receive the pivot shaft and is closed by a flange 56 having a centrally located hole 57 therein. The locking cap 54 is kept in place on the end of the pivot shaft assembly by means of a compression spring 58 which is trapped between the flange 56 and the head of a long shanked bolt 59 which extends through the hole 57 and engages a threaded hole (not shown) in the end of the pivot shaft 51. The opposite end of the pivot shaft 51 has a flange member 61 secured thereto by a threaded bolt 62 which engages threads in a threaded hole (not shown) in that end of the pivot shaft 51.

The lower bead breaker pivot shaft assembly 47 is shown in a normal operating position in FIG. 4A, wherein the major diameter portions of the pivot shaft 51 are pivotally engaged at the bearing openings 42 and 43 by the bead breaker shoe support arms 39 and 41 respectively, as well as by the inside diameter of the pivot tube 38. The pivot shaft assembly is maintained in the position shown in FIG. 4A by the force exerted by the compression spring 58 against the locking cap 54. The locking cap is thereby held in a position overlying the release diameter 53 as shown. With the minimal forces exerted axially along the shaft 51 during bead breaking operations, the pivot shaft assembly is readily held in the position of FIG. 4A by the aforementioned compression spring force.

It is oftentimes desirable to break only the upper bead from a wheel rim tire assembly 48 mounted on the frusto-conical rim support table 13. Sometimes there is a danger, when demounting tires containing inner tubes, of pinching the inner tube between the lower bead breaker shoe and the wheel rim, because the position of the tube relative to the lower bead breaker and the wheel rim is hidden from view. Additionally, to avoid rim/shoe contact, it may be desirable to only break a bead from a wheel rim when the relative position of the bead breaker shoe and the wheel rim may be readily observed. Clearly when a wheel is mounted on the table 13 and the lower bead breaker is actuated, there is no visual guide available for the movement of the lower bead breaker relative to the rim. In such a case the lower bead breaker shoe is desirably inactivated and the upper bead breaker shoe is used to break the upper bead, the wheel is removed from the table, inverted, reinstalled on the table, and the other bead is also broken by using the upper bead breaker.

To accomplish the foregoing deactivation of the lower bead breaker, reference is made to FIG. 4B of the drawings. Initially the lower bead breaker shoe 32 is flipped to a near vertical position by manually pivoting it about the axis of the pivot shaft assembly 47 as seen in FIG. 2. Then the index and middle finger are placed behind the flange 56 on the locking cap 54 and the thumb is placed on the head of the long shanked screw 59. The compression spring 58 is compressed by a squeezing action between the thumb and the two aforementioned fingers, thereby withdrawing the locking cap 54 from the position overlying the release diameter 53. In such a condition the entire lower bead breaker pivot shaft assembly 47 is moved axially in the direction of the arrow shown in FIG. 4B (to the right) which moves the release diameters 52 and 53 within the bearing openings 42 and 43 respectively. As mentioned hereinbefore, the openings or keyways 44 and 46 extending between the bearing openings and the edges of the bead breaker shoe support arms are larger than the release diameters 52 and 53. Consequently, the vertically disposed lower bead breaker shoe 32 may be grasped by the free hand and lifted upwardly to remove it altogether from the tire changing machine. The machine may now be operated in the usual manner, which will cause the lower bead breaker levers 24 to move in accordance with the urging of the drive piston 22, but none of the structure set in motion will move close to the lower edge of a wheel rim mounted on the rim support table 13. All bead breaking in this configuration of the tire changing machine will be observable as it is accomplished by the upper bead breaker assembly 19.

It is apparent that the reinstallation of the lower bead breaker 32 is easily accomplished by moving the lower bead breaker pivot shaft assembly 47 into the position shown in FIG. 4B as previously described, and passing the keyways 44 and 46 over the release diameters 52 and 53 respectively. The locking cap 54 is then released and the compression spring 58 thereby drives the pivot shaft 51 back into the position depicted in FIG. 4A of the drawings. The bead breaker shoe 32 is lowered to the operating position resting atop the knurled adjustment knob 37 at an appropriate adjusted level and the tire changing machine is once again in a configuration to break both upper and lower beads of a tire from a wheel rim in a normal fashion.

The quick release mechanism, while described herein for releasing a lower bead breaker shoe, is envisioned as having application for quick release of an upper bead breaker shoe from the upper bead breaker assembly 19 seen in FIG. 1.

Although the best mode contemplated for carrying out the present invention has been herein shown and described, it will be apparent that modification and variation may be made without departing from what is regarded to be the subject matter of the invention.

What is claimed is:

1. a manually actuated quick release for a lower bead breaker apparatus on a tire changing machine which is used for separating a tire from a wheel rim, wherein a bead breaker lever having a lower bead breaking shoe pivotally mounted thereon is driven toward and away from a position on the tire changing machine adjacent a wheel rim support table which is adapted to mount a wheel rim and tire assembly, comprising a shoe pivot shaft having a shaft pivot diameter and two smaller spaced release diameters thereon, a pair of lower bead breaking shoe support arms attached to the lower bead breaking shoe separated by the same distance as the spacing between said release diameters and having aligned shoe bearing openings formed therein configured to accept said shaft pivot diameter, said support arms each having a keyway cut between the edge thereof and said bearing openings, said keyways each having a width smaller than said pivot diameter and larger than said release diameters, a locking cap at one end of said pivot shaft manually displaceable between a lock position and a release position, and means for yieldably urging said lock cap toward said lock position, whereby manual movement of said lock cap to said release position and of said shaft laterally in said shoe bearing openings aligns said release diameters simultaneously with said support arm keyways and thereby frees the lower bead breaking shoe so that it may be manually withdrawn from the tire changing machine.

2. In combination with a tire changing machine of the type wherein a framework supports a wheel rim support table adapted to receive and secure a wheel rim thereon, wherein a bead breaker mechanism includes a bead breaker shoe operatively connected to a bead breaker lever, a power source coupled to drive the lever so that the shoe is driven toward a rim and tire assembly mounted on the support table to break the tire bead away from the rim, and wherein spaced bead breaker shoe support arms have mounting holes therein for pivotally mounting the shoe to the lever, manually operated quick release means for detaching the bead breaker shoe from the bead breaker lever comprising a shoe pivot shaft having a pivot diameter configured to fit within the support arm mounting holes and having two smaller release diameters spaced apart at substantially the spacing of the shoe support arms, the shoe support arms having keyways cut therein extending from the mounting holes through the edges thereof, said keyways being wider than said two release diameters and narrower than the mounting hole diameters, and yieldable means for urging said pivot shaft pivot diameter axially to rest within the support arm mounting holes and for allowing said pivot shaft to be manually moved axially thereagainst to align said two smaller release diameters simultaneously with said keyways, whereby the bead breaker shoe may be manually removed radially from said shoe pivot shaft.

3. A manually operated quick release apparatus for a tire changing machine bead breaker shoe assembly having a pair of support arms connecting the shoe to the tire changing machine, comprising a pivot tube attached to the tire changing machine, a pivot shaft adapted to be contained within said pivot tube for mounting the shoe assembly on the tire changing machine, said pivot shaft having a pivot diameter thereon, a pair of spaced release diameters on said pivot shaft, said release diameters being smaller than said pivot diameter, a pair of split bearings in the shoe assembly support arms, spaced apart by substantially the spacing of said release diameters and configured to receive and support said pivot diameter, and means for yieldably urging said pivot shaft to dispose said release diameters away from and said pivot diameter within both of said split bearings, so that when said pivot shaft is moved axially against said means for yieldably urging, said release diameters are simultaneously disposed within said split bearings and the shoe assembly may be manually removed radially from said pivot shaft.

4. A quick release apparatus as in claim 3 wherein said means for yieldably urging comprises a lock cap and spring means for urging said lock cap to overlie one of said release diameters.

5. A quick release apparatus as in claim 3 wherein said split bearing in said shoe support arms comprise aligned holes therein and segments removed therefrom which extend between each of said aligned holes and the edges of said support arms, the widths of said removed segments being larger than the release diameters and smaller than said pivot diameter.

6. A quick release apparatus for a bead breaker shoe on a tire changing machine wherein the shoe has a pair of spaced shoe support arms each having an aligned shoe mounting hole therein, comprising
    a shoe pivot shaft having a diameter configured to fit within the support arm mounting holes,
    a pair of spaced release diameters on said shoe pivot shaft separated by substantially in the same spacing as between said shoe support arms and being smaller than said shaft diameter,
    said support arms each having a keyway extending from said mounting hole through the edge of said support arm,
    means for guiding said pivot shaft toward a release position at which said release diameters are simultaneously aligned with said keyways and the shoe is releasable from said shaft, and
    means for yieldably urging said pivot shaft away from said release position.

7. A quick release apparatus as in claim 6 wherein said means for guiding comprises
    axial guide means, and
    radial guide means.

8. A quick release apparatus as in claim 7 wherein said axial guide means comprises a tube attached to the tire changing machine, aligned with the shoe mounting holes and adapted to accept said pivot shaft, and wherein said radial guide means comprises said support arm keyways.

9. A quick release apparatus as in claim 6 together with adjustable means for setting the attitude of the bead breaker shoe relative to the tire changing machine.

* * * * *